(12) United States Patent
Izumi et al.

(10) Patent No.: US 7,145,993 B2
(45) Date of Patent: Dec. 5, 2006

(54) COMMUNICATION APPARATUS

(75) Inventors: Michihiro Izumi, Chiba (JP); Toshio Kenmochi, Kanagawa (JP); Yutaka Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 09/973,056

(22) Filed: Oct. 10, 2001

(65) Prior Publication Data
US 2002/0067514 A1 Jun. 6, 2002

(30) Foreign Application Priority Data
Oct. 12, 2000 (JP) ............... 2000-311918

(51) Int. Cl.
*H04M 11/00* (2006.01)
(52) U.S. Cl. ............... 379/100.13; 379/100.12; 379/100.17
(58) Field of Classification Search ............ 379/93.24, 379/100.01, 100.06, 100.08, 100.09, 100.12–100.14, 379/100.17, 355.01, 355.06, 355.1; 358/400, 358/402, 442–443, 1.15, 422, 423; 709/206, 709/233, 238
See application file for complete search history.

(56) References Cited

U.S. PATENT DOCUMENTS

| | | | | |
|---|---|---|---|---|
| 5,033,859 A | * | 7/1991 | Yamamoto | 358/468 |
| 5,881,233 A | * | 3/1999 | Toyoda et al. | 709/233 |
| 6,101,244 A | * | 8/2000 | Okada | 379/100.08 |
| 6,437,873 B1 | * | 8/2002 | Maeda | 358/1.15 |
| 6,438,605 B1 | * | 8/2002 | Idehara | 709/238 |
| 6,545,768 B1 | * | 4/2003 | Matsubara et al. | 358/1.15 |

FOREIGN PATENT DOCUMENTS

| | | | |
|---|---|---|---|
| EP | 812100 A2 | | 12/1997 |
| EP | 812100 A2 | * | 12/1997 |
| JP | 9-247334 | | 9/1997 |
| JP | 9-325924 | | 12/1997 |
| JP | 10-042068 | * | 2/1998 |
| JP | 10042068 A | * | 2/1998 |
| JP | 10126600 A | * | 5/1998 |
| JP | 2000059531 A | * | 2/2000 |

* cited by examiner

*Primary Examiner*—Melur Ramakrishnaiah
(74) *Attorney, Agent, or Firm*—Fitzpatrick, Cella, Harper & Scinto

(57) ABSTRACT

A communication apparatus includes a register for registering a facsimile number of a sending destination for an abbreviation number, a register for registering an electronic mail address of the sending destination for the same abbreviation number, a key corresponding to the abbreviation number, a key representing facsimile sending, and a key representing electronic mail sending, a unit for executing the facsimile sending of a read image to the registered facsimile number when the key representing the facsimile sending is depressed pursuant to depression of the key corresponding to the abbreviation number, and a unit for executing the electronic mail sending of the read image to the registered electronic mail address when the key representing the electronic mail sending is depressed pursuant to depression of the key corresponding to the abbreviation number, so that it is possible to reduce the number of necessary keys.

5 Claims, 7 Drawing Sheets

COMMUNICATION APPARATUS

BACKGROUND OF THE INVENTION

1. Field of the Invention

The present invention relates to a facsimile apparatus which is connected to an analog public line (PSTN: Public Switched Telephone Network) or a digital public line (ISDN: Integrated Services Digital Network) and has a function to access a server through the Internet.

2. Related Background Art

In recent years, ISDN and the Internet have become remarkably widespread, whereby a home page is downloaded and an electronic mail (called an E-mail hereinafter) is sent/received by accessing a server from a terminal such as a personal computer (called a PC hereinafter) through the Internet.

Such a use of the Internet is not limited to the PC, i.e., an application by which an image to be sent by FAX (facsimile) is sent through the Internet has been proposed. For example, Japanese Patent Application Laid-Open No. 9-325924 (EP 0 812 100 A2) proposes that image data read out by a facsimile apparatus is converted to TIFF (Tagged Image File Format) data and sent as an E-mail.

A conventional method of sending an E-mail by using the facsimile apparatus will be explained hereinafter.

First, a user sets an original (or a document sheet) to be sent on an original mounting board, and inputs a password to select a user name for which the user himself has been registered. Next, the user selects from a destination table a destination to which the original is to be sent, and depresses a start key after depressing an abbreviation number key or depresses a one-touch key.

A communication terminal apparatus T reads the original on the original mounting board one by one, causes a coder/decoder to once encode all the pages of the original in an MMR (Modified Modified READ) method to obtain G3-format image data, and then stores the obtained G3-format image data in an image memory. The communication terminal apparatus reads out the destination designated by an abbreviation number or a one-touch dial number, from the destination table. If an Internet E-mail address of the destination is not registered in the destination table, G3 or G4 facsimile sending is executed. Conversely, if the Internet E-mail address has been registered, a process to send an E-mail is executed.

When the image data is sent as an E-mail, the G3-format image data is subjected to TIFF conversion and then sent. In such a TIFF conversion process, header information of TIFF Class F is added to the head of the G-3 format image data, thereby forming TIFF image data. Since the TIFF image data is binary data, this binary data is further converted into text data.

Then, a mail editing unit adds a header of the E-mail to the TIFF image data converted into the text data.

If the data of the E-mail format is completed, dial-up connection is executed to the Internet. If a telephone line to a provider is established, the communication terminal apparatus logs in according to a PAP (Password Authentication Protocol) procedure and sends the E-mail according to an SMTP (Simple Mail Transfer Protocol) procedure. After the E-mail was sent, the communication terminal apparatus logs off, whereby the telephone line is released.

Further, Japanese Patent Application Laid-Open No. 9-247334 proposes that it is automatically judged whether an original to be sent should be actually sent as an E-mail or facsimile. In this application, it is judged on the basis of a kind of number or symbol registered on an abbreviation dial key or a one-touch dial key whether such number or symbol represents an E-mail address or a facsimile number, and thus optimum sending is executed.

In the former conventional example as before-mentioned, when the sending process is executed by depressing the abbreviation number key or the one-touch key, it is determined whether the data should be sent as the E-mail or the facsimile according to whether or not the E-mail address has been registered for the abbreviation number key or the one-touch key.

In the latter conventional example, when the sending process is executed by depressing a start key, it is determined whether the data should be sent as the E-mail or the facsimile on the basis of the kind of information registered on the abbreviation dial key or the one-touch dial key.

In these examples, such a problem as follows has happened.

Recently, a case where an individual has both an E-mail reception means and a facsimile reception means has increased. Therefore, even if information is sent to an identical destination, both a case to send the information by the E-mail and a case to send the information by the facsimile may arise according to a type of the information to be sent of a sending time.

In the conventional facsimile apparatus, in case of flexibly switching a sending method to the identical destination between the E-mail and the facsimile, it is necessary to allocate the E-mail and the facsimile respectively to different abbreviation dial keys or one-touch dial keys.

As a result, it is necessary to prepare a lot of abbreviation number keys and/or one-touch keys, whereby there has been a problem that the number of destinations capable of being registered decreases.

SUMMARY OF THE INVENTION

In the present invention, an object thereof is to solve the above-described conventional problem by providing in a facsimile apparatus a dedicated key to be depressed only in case of sending an E-mail, also enabling to register both an E-mail address and a facsimile number for one abbreviation dial number or one-touch dial number, and thus linking together and operating the dedicated key and a corresponding abbreviation dial key or the like.

DETAILED DESCRIPTION OF THE PREFERRED EMBODIMENTS (First Embodiment)

Hereinafter, the embodiment of the present invention will be explained in detail with reference to the attached drawings.

Figure 1:
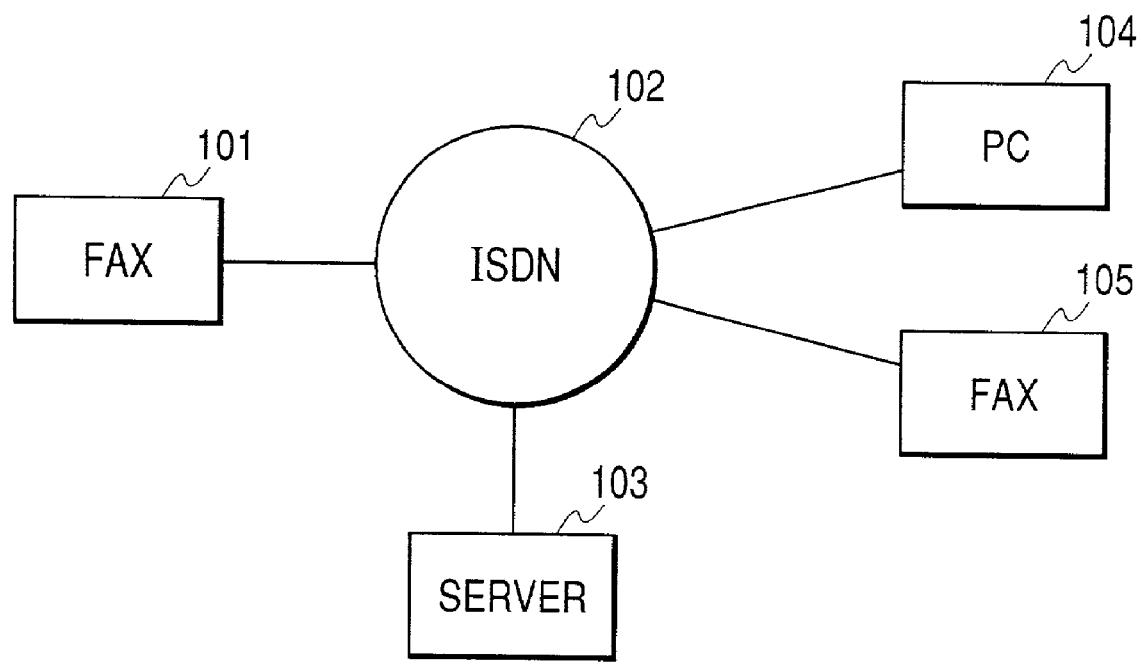
FIG. 1 is a block diagram showing the structure of a system to which the present invention is applied.

FIG. 1 is a block diagram showing the structure of a system according to the first embodiment of the present invention.

In FIG. 1, numeral 101 denotes a facsimile apparatus (FAX) to which the present invention is applied, numeral 102 denotes ISDN, numeral 103 denotes a server, numeral 104 denotes a personal computer (PC) on a destination, and numeral 105 denotes a facsimile apparatus (FAX) on the destination.

Figure 2:
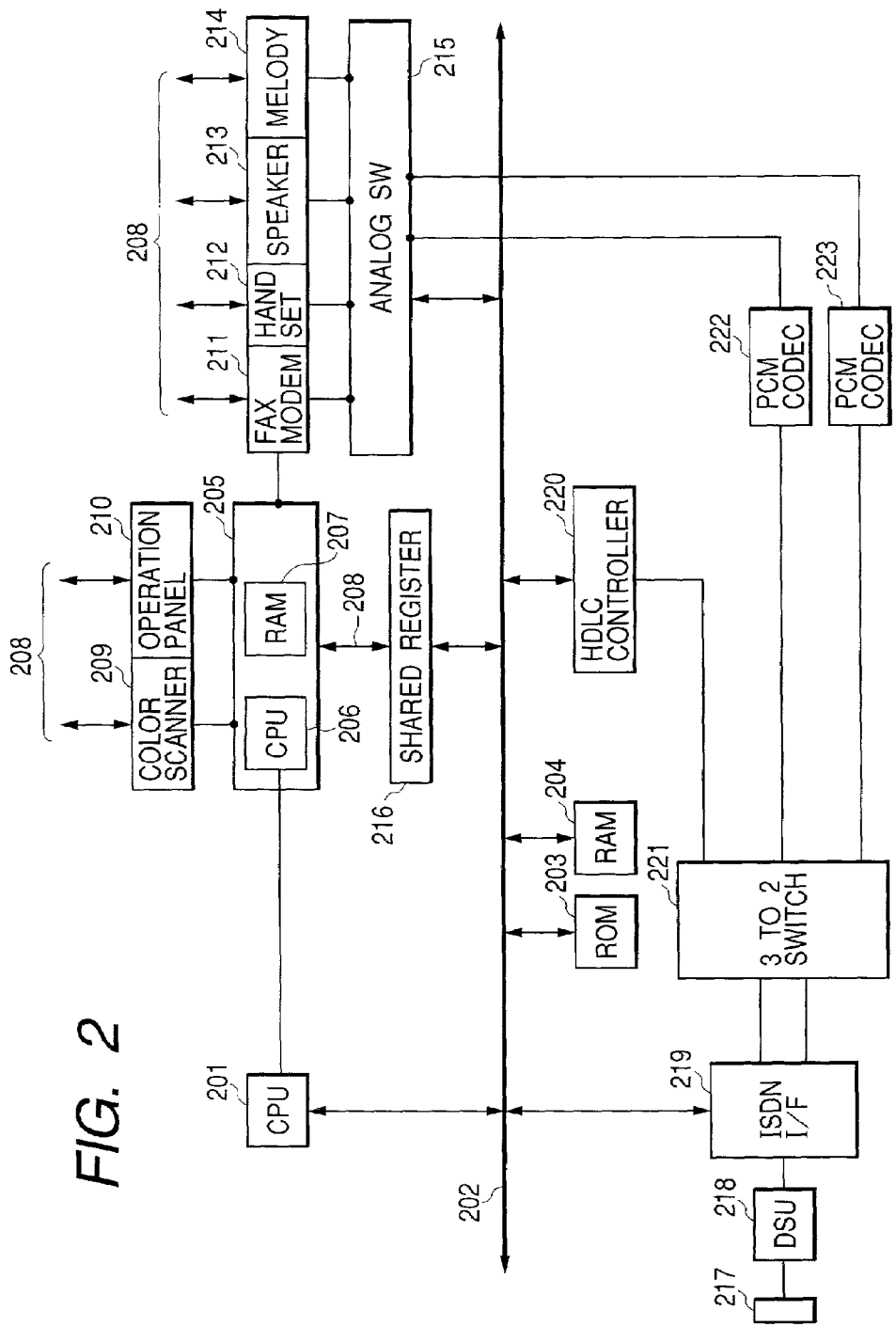
FIG. 2 is a block diagram showing the structure of a facsimile apparatus 101 to which the present invention is applied.

FIG. 2 is a block diagram showing the structure of the facsimile apparatus 101.

In FIG. 2, numeral 201 denotes a CPU (central processing unit), numeral 202 denotes a data bus and an address bus, numeral 203 denotes a ROM, and numeral 204 denotes a RAM.

Numeral 205 denotes a facsimile (FAX) engine unit which is composed of a CPU (microcomputer), an image processing unit and the like. Information is exchanged between the facsimile engine unit 205 and the CPU 201 through a serial communication interface. Numeral 206 denotes a CPU for the facsimile engine unit, numeral 207 denotes a RAM for the facsimile engine unit, and numerals 208 denote data buses for the facsimile engine unit. The facsimile engine unit 205 is connected to various devices 209 to 214 necessary to execute a facsimile operation and thus controls them. Numeral 209 denotes a color scanner, numeral 210 denotes an operation panel, numeral 211 denotes a facsimile modem, numeral 212 denotes a handset, numeral 213 denotes a speaker, and numeral 214 denotes a holding melody generation unit. These devices 211 to 214 are controlled by the facsimile engine unit 205 and also connected to an analog switch 215, whereby analog data of audio or facsimile is connected to a public communication line through the analog switch 215.

Numeral 216 denotes a shared register which is used when the data is exchanged between the device connected to the data bus of the facsimile engine unit and the device connected to the data bus of the CPU 201.

Numeral 217 denotes a modular connector which connects ISDN (U point), numeral 218 denotes a DSU (Digital Service Unit) which converts the data communicated with an office exchange into a signal of TTL level. Numeral 219 denotes an ISDN interface which executes control based on Layers 1 to 3 of ISDN, and has a function to input/output the data via B channel of ISDN.

Numeral 220 denotes an HDLC (High-level Data Link Control) controller which executes a composite/decomposite process regarding the data of HDLC format for ISDN.

Numeral 221 denotes a port switch which has a function to determine which of the HDLC controller 220 and the two ports of the analog switch 215 the data sent by B1 and B2 channels of ISDN is to be connected, under the control of the CPU 201.

Numerals 222 and 223 denote PCM (Pulse Code Modulation) codec each of which executes a digital/analog converting process between the port switch 221 and the analog switch 215.

Figure 3:
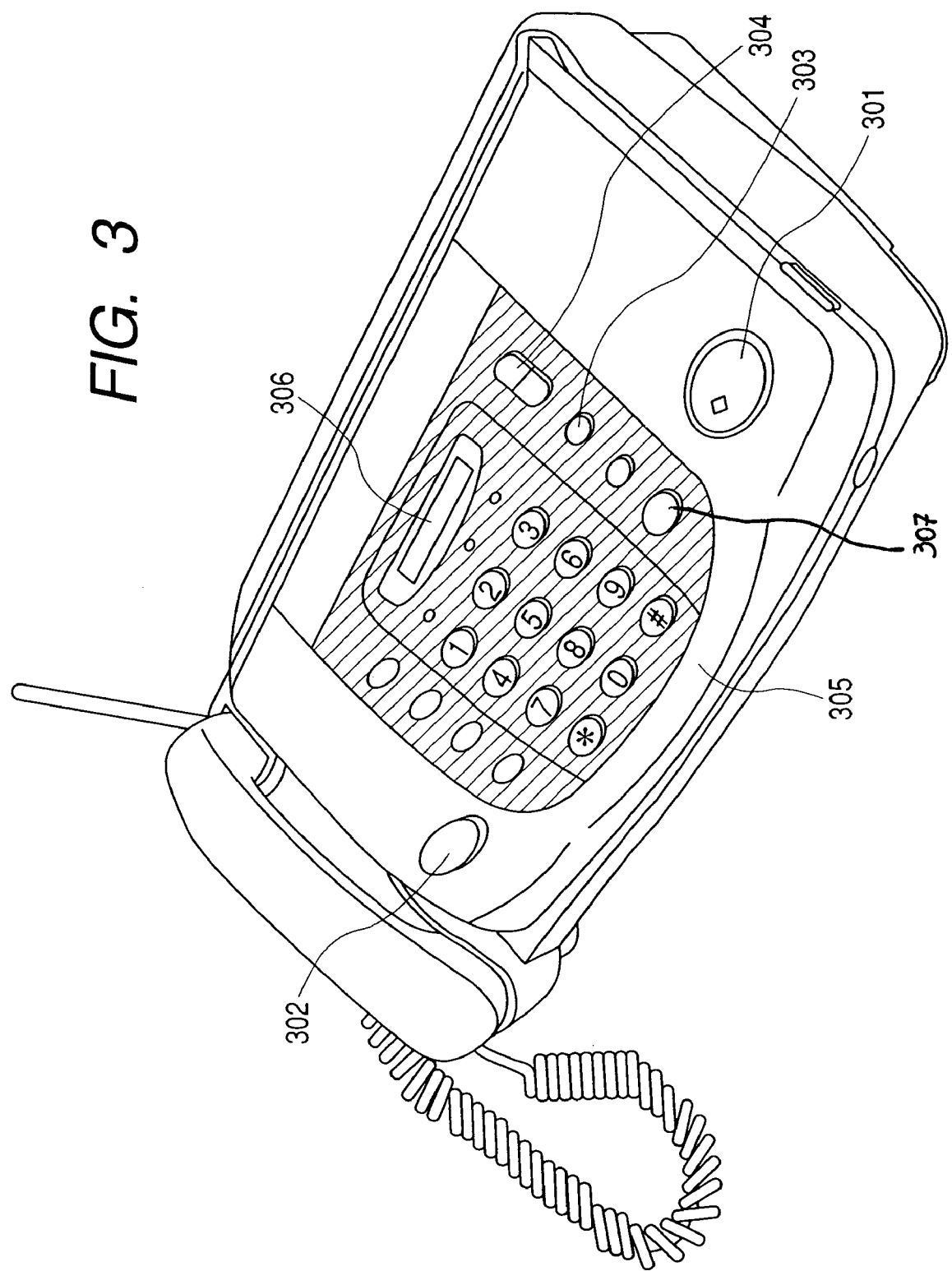
FIG. 3 is a diagram showing an operation unit of the facsimile apparatus 101 to which the present invention is applied.

FIG. 3 is a diagram showing an operation unit of the facsimile apparatus to which the present invention is applied. In FIG. 3, numeral 301 denotes a FAX sending ("FAX") key, numeral 302 denotes an E-mail sending ("E-MAIL") key, numeral 303 denotes an abbreviation number ("ABBR") key, numeral 304 denotes a selection ("SELECT") key, numeral 305 denotes a dial key, and numeral 306 denotes a liquid crystal display.

Figure 4:
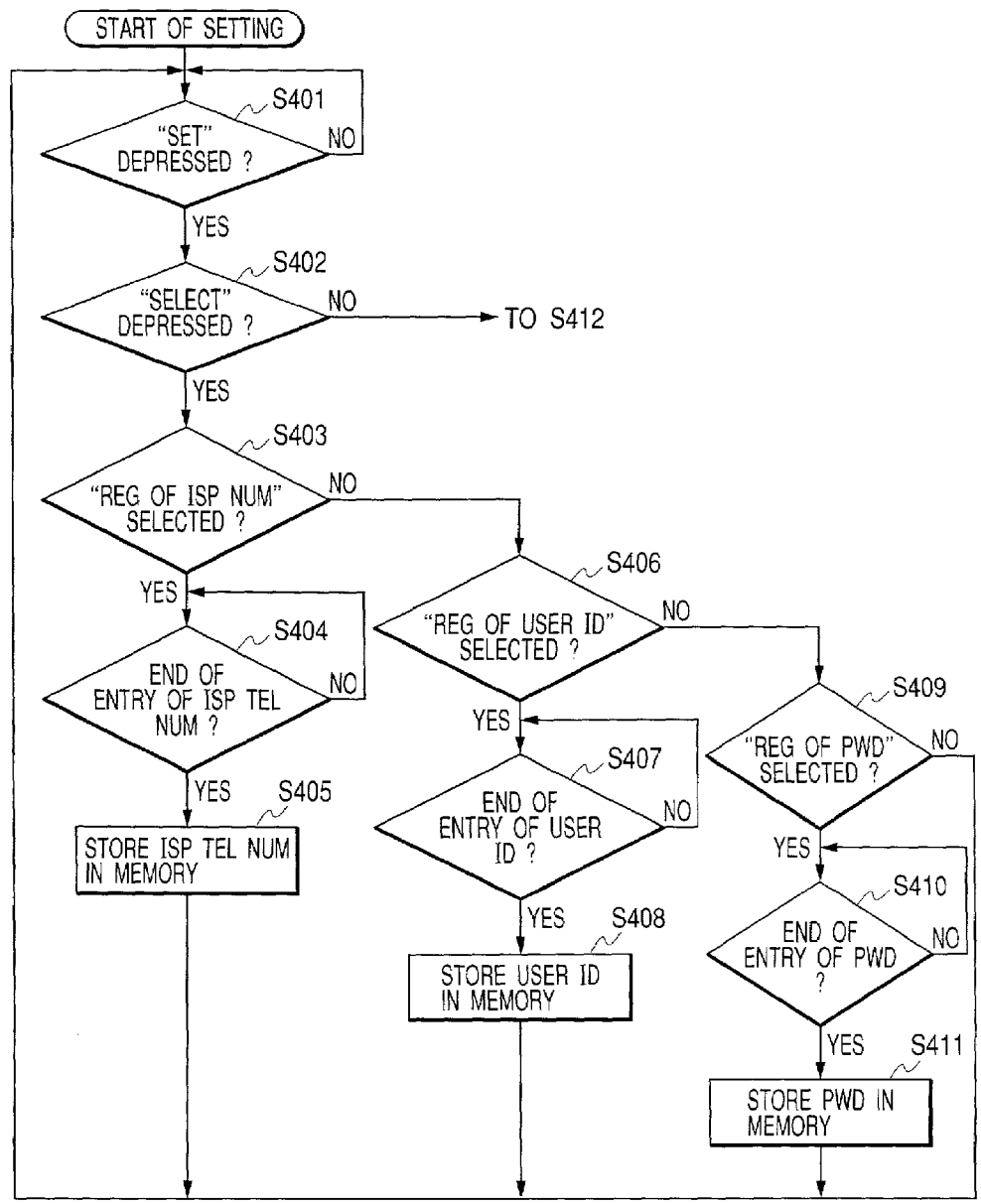
FIG. 4 is a flow chart showing an operation in a case where an E-mail address and a facsimile number are registered for an abbreviation number of facsimile.
Figure 5:
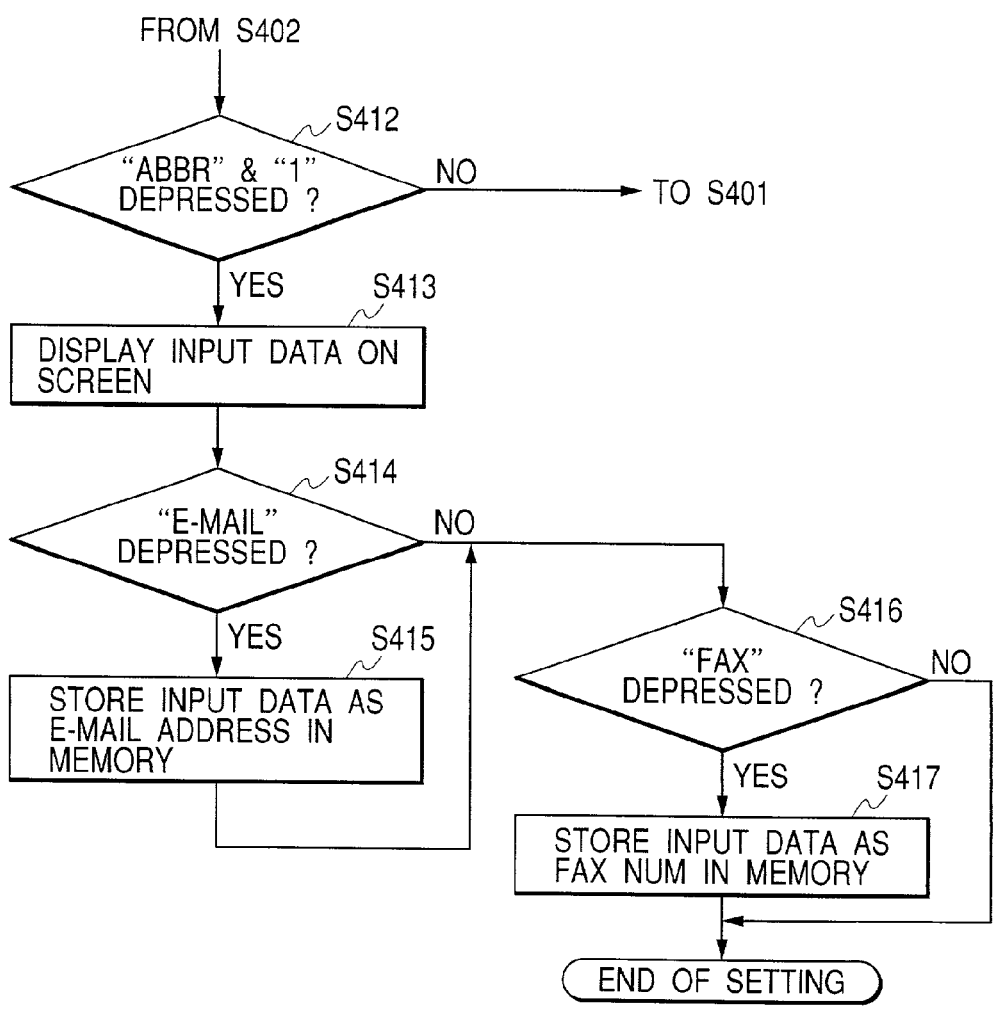
FIG. 5 is a flow chart showing the operation in the case where the E-mail address and the facsimile number are registered for the abbreviation number of facsimile.

FIGS. 4 and 5 are flow charts showing an operation in a case where an E-mail address and a facsimile number are registered for an abbreviation number of facsimile.

Figure 6:
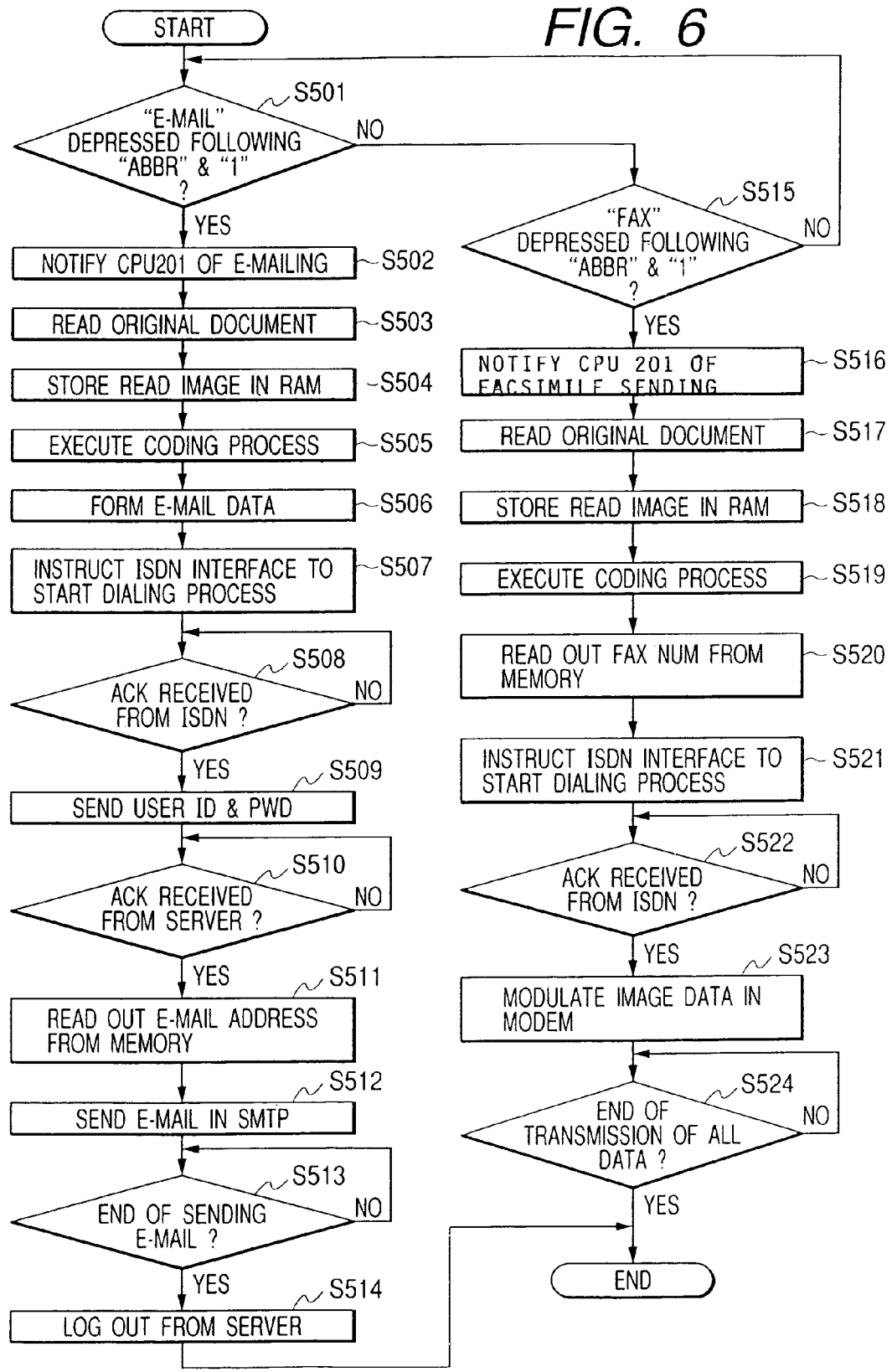
FIG. 6 is a flow chart showing an operation in a case where the facsimile apparatus executes E-mail sending of a read image.

FIG. 6 is a flow chart showing an operation in a case where the facsimile apparatus executes E-mail sending of a read image.

Figure 7:
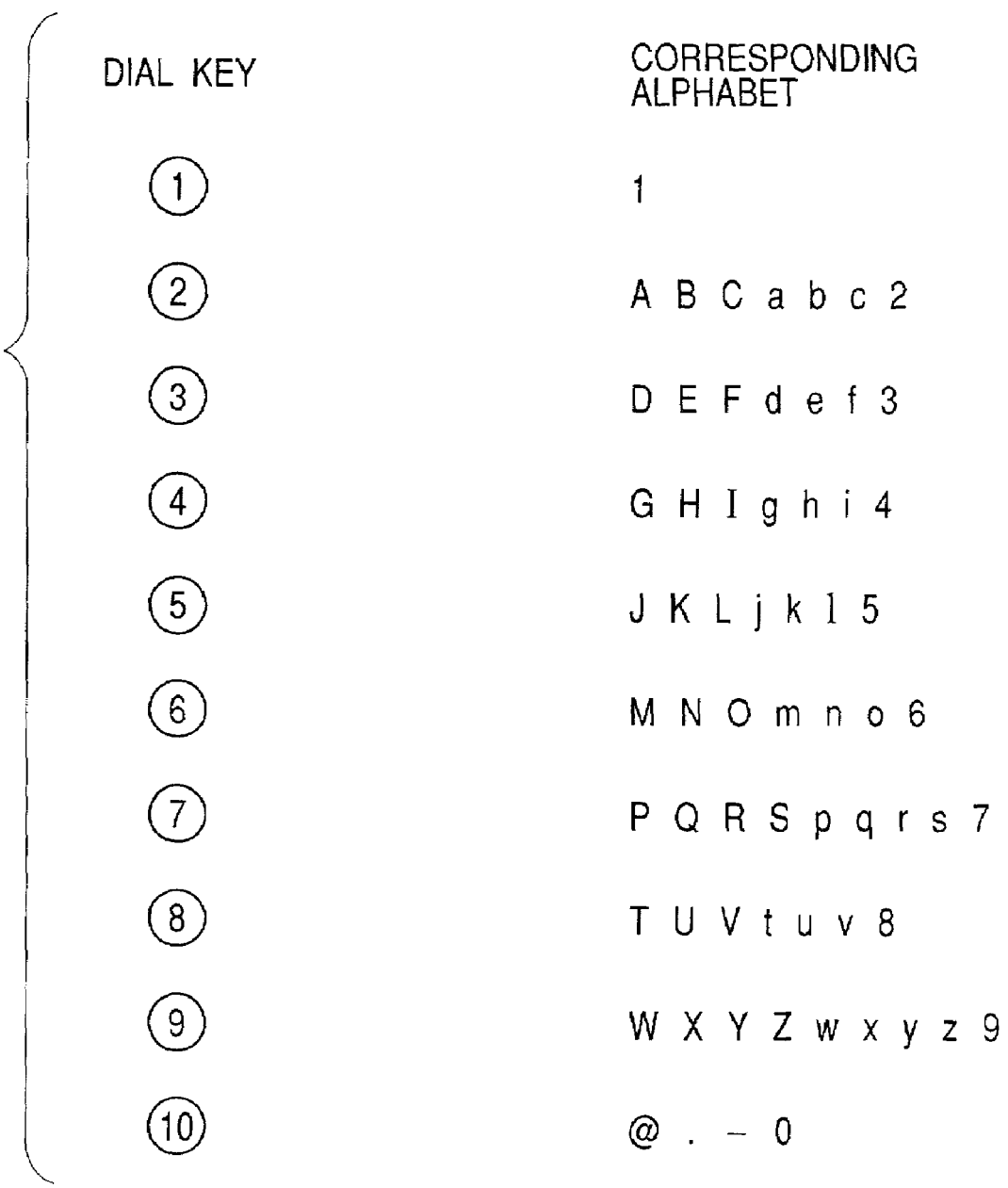
FIG. 7 is a table showing correspondence between keys and characters used in case of registering the abbreviation number.

FIG. 7 is a table showing correspondence between keys and characters used when numbers and alphabet are registered for an abbreviation dial key or a one-touch dial key.

Hereinafter, an operation in a case where the facsimile apparatus reads image data and sends the read data as a file with an E-mail.

(Method of Registering Sending Destination's Address and Number)

In order to send the data to the Internet by using the facsimile apparatus according to the present invention, it is first necessary to set a telephone number of ISP (Internet Service Provider) having a server, and a user ID and a password to access the server.

After then, the E-mail address, the facsimile number and the like of the destination are registered for the abbreviation dial keys or the like.

In the facsimile apparatus to which the present invention is applied, such setting as above can be executed in the same operation procedure as that for setting an ordinary abbreviation dial number or the like.

First, when the telephone number of the ISP is registered, after a "SET" key was depressed (S401), the "SELECT" key is depressed (S402). Since a screen to be displayed is changed every time the "SELECT" key is depressed, a "#" key is depressed when a message "REG OF ISP NUM" representing registration of the ISP number is displayed on the screen (S403). Thus, a message "ISP=" is displayed on the screen, and the telephone number is input. For example, if the telephone number of the ISP is "03-1234-1111", numerical keys representing "0312341111" are sequentially depressed (S404). If the telephone number is input, the CPU 201 stores ISP's number data in the RAM 204 (S405).

Next, the user ID is registered. Like the above registration of the ISP's telephone number, if the "SELECT" key is depressed after the "SET" key was depressed, since a message "REG OF USER ID" representing registration of the user ID is displayed, the "#" key is depressed (S406). Thus, a message "UID=" is displayed on the screen, and the user ID given by the ISP is input according to the correspondence table shown in FIG. 7. If the user ID is input (S407), the CPU 201 stores user ID information in the RAM 204 (S408).

Similarly, the password is registered. If the "SELECT" key is depressed after the "SET" key was depressed, since a message "REG OF PWD" representing registration of the password is displayed, the "#" key is depressed (S409). Thus, a message "PWD="is displayed on the screen, and the password given by the ISP is input according to the correspondence table shown in FIG. 7. If the password is input (S410), the CPU 201 stores the password in the RAM 204 (S411).

After the above settings end, registration of the E-mail address and the facsimile number for the abbreviation number is conducted.

First, the E-mail address is registered. For example, if an address "pat@canon.co.jp" is registered and set for an abbreviation number "1", the "SET", "ABBR" and "1" keys on the operation panel are depressed in due order (S412). Thus, since a message "*1=" is displayed on the liquid crystal display, whereby the following data can be input.

In order to input the above address, the dial keys and the "#" key are depressed by making a combination such as "7", "7", "7", "7", "7", "#", "2", "2", "2", "2", "#", "8", "8", "8", "8", "#", "0", "#", . . . , "0", "0", "#", "5", "5", "5", "5", "#", "7", "7", "7", "7", "7" and "#", whereby the address is set. At this stage, since the address "pat@canon.co.jp" is displayed on the display (S413), the "E-MAIL" key is depressed after confirming the displayed address. If the "E-MAIL" key is depressed (S414), the CPU 201 stores the input E-mail address at a predetermined address of the RAM 204 (S415), whereby the above address is registered as the E-mail address for the abbreviation number "1".

Next, the method of registering the facsimile number will be explained. For example, if a facsimile number "03-1234-2222" is registered, the "SET", "ABBR" and "1" keys are depressed in due order. Thus, since the message "*1=" is displayed on the liquid crystal display, then the numerals are sequentially input such that a number composed of "0", "3", "1", "2", "3", "4", "2", "2", "2" and "2" is displayed. At this stage, since a facsimile number "0312342222" is displayed on the display, the "FAX" key is depressed after confirming the displayed number. If the "FAX" key is depressed (S416), the CPU 201 stores the input facsimile number at a predetermined address of the RAM 204 (S417), whereby the above facsimile number is registered for the abbreviation number "1".

The numbers registered as above are stored respectively at different addresses on the memory, and the CPU 201 can read the stored number at an arbitrary time. (Method of Sending Data)

As above, it is assumed that an E-mail address "abc@canon.co.jp" and a facsimile number "03-123-4567" of a destination "A" have been registered for an abbreviation dial "1". In this case, a process to send a read image to the E-mail address or the facsimile apparatus of the destination "A" will be explained with reference to FIG. 6.

First, in case of sending the image data as the E-mail, in the state that an original document to be sent is being inserted into a feeder, the "ABBR" and "1" keys are sequentially depressed, and the "E-MAIL" key on the operation panel is then depressed.

If the CPU 206 detects the depression of the "E-MAIL" key (S501), the CPU 206 notifies the CPU 201 of E-mailing (S502). Then, the scanner 209 is started, whereby reading of the inserted original document starts (S503). The read image is stored in the RAM 207 (S504), and after the reading of all the images ended, data conversion such as MH (Modified Huffman) coding, MR (Modified READ) coding, MMR coding and the like is executed to the read image data by the facsimile engine unit 205 (S505).

Next, like the conventional manner, the CPU forms the E-mail data to be sent (S506).

If the data of the E-mail format is completed, dial-up connection is executed to the Internet. Then, the CPU 201 instructs the ISDN interface to execute a sending process for the ISP of the previously set number (S507).

If the ISDN interface executes the sending process and is thus connected to the server on the side of the ISP (S508), a log-in procedure is executed. In the log-in procedure, the previously set user ID and the password are sent to the server according to the PAP (S509). When a response ACK is received from the server, the log-in procedure ends (S510).

Next, the CPU 201 reads, from the memory address at which the E-mail address for the abbreviation dial has been stored, the E-mail address to which the data should be sent (S511). Then, the previously formed E-mail is sent to the read address according to the SMTP (S512). Concretely, an SMTP connection request command is formed, the image data is transferred from the RAM 207 to the RAM 204 through the shared register 216, the transferred image data is then converted by the HDLC controller 220 to have a predetermined format, and the thus obtained image data is sent to the server. If a response from the server is received, then the E-mail data is sent. If data sending ends (S513), an end command is sent, and the operation according to the SMTP ends if the server responds to the sent end command.

After the sending of the E-mail according to the SMTP is completed, the apparatus logs out from the server (S514) and then disconnects the communication line, whereby a series of communication ends.

Next, in case of sending the image data as the facsimile data, in the state that the original document to be sent is being inserted into the feeder, the "ABBR" and "1" keys are sequentially depressed, and the "FAX" key on the operation panel is then depressed (S515).

If the CPU 206 detects the depression of the "FAX" key, the CPU 206 notifies the CPU 201 of facsimile sending (S516). Then, the scanner is started, whereby reading of the inserted original document starts (S517). The read image is stored in the RAM 207 of the facsimile engine unit 205 (S518), and after the reading of all the images ended, data conversion such as MH coding, MR coding, MMR coding and the like is executed to the read image data by the facsimile engine unit 205 (S519). The converted data is again stored in the RAM 207.

At this stage, the CPU 201 reads, from the memory address at which the facsimile number for the abbreviation dial "1" has been stored, the facsimile number to which the data should be sent (S520). Then, the CPU 201 instructs the ISDN interface to execute a sending process (S521), and the ISDN interface sends the data to the previously read facsimile number.

If the destination's facsimile apparatus responds (S522), the sending of the converted image data is started. In the present embodiment, since the G3 facsimile sending is executed by using ISDN, the converted image data is modified by the facsimile modem on the basis of a G3 protocol (S523), the modified image data is subjected to digital coding by the PCM codec, and thereafter the encoded image data is sent by using the B1 channel of ISDN. If the sending of all the image data ends (S524), the G3 protocol ends, and the communication line is disconnected, whereby a series of communication processes ends.

(Effect of Present Embodiment)

As described above, both the E-mail address and the facsimile number are registered for the abbreviation number "1", and in the stage of sending the original document the "E-MAIL" key or the "FAX" key is depressed according to necessity, whereby there is a significant effect that the E-mail sending and the facsimile sending to the identical destination can be flexibly changed with each other without increasing the number of abbreviation dial keys and the like.

(Second Embodiment)

The first embodiment premises that ISDN being the digital public communication line is used. However, the same effect as that in the first embodiment can be obtained by the same operation even in case of an analog public communication line.

In this case, data modified by a data modem is used, in case of the E-mail sending, to send the E-mail to a server, and a digital conversion process by a PCM codec is unnecessary in case of facsimile sending. The present embodiment is different from the first embodiment in these points.

(Third Embodiment)

In the first embodiment, only the E-mail is sent in the E-mail sending. However, if a communication partner at a destination does not always use the Email, there is a case where it is delayed that the communication partner knows the E-mail reached.

Thus, it is also possible, by facsimile, to notify the communication partner of the sending of the E-mail. In this case, before and after the process to send the E-mail in the first embodiment, a facsimile document indicating that the E-mail has been sent can be sent to the facsimile number registered for the abbreviation number identical with that for which the E-mail address was registered.

(Fourth Embodiment)

In the first embodiment, only either the E-mail sending or the facsimile sending is executed. However, there is a case where it is impossible to judge whether the data should be sent by the E-mail or the facsimile.

In this case, by utilizing the fact that in ISDN the communication can be executed with two channels at the same time, it is possible to send the same original document by both the E-mail and the facsimile at the same time.

Concretely, such an operation as above can be achieved by depressing the "E-MAIL" key and the "FAX" key simultaneously or sequentially, after depressing the "ABBR" key and the "1" key. By depressing these keys, the E-mail sending process as explained in the first embodiment is executed in B1 channel of ISDN, while the facsimile sending process is executed in B2 channel thereof.

It should be noted that the operation is not limited to the above, i.e., the same effect as above can be obtained in a manner of providing a dedicated key 307 for simultaneous data sending.

(Fifth Embodiment)

In the first embodiment, when the data is registered for the abbreviation dial key, it is determined, according to the kind of key depressed pursuant to the data input, whether the input data should be registered as the E-mail address or the facsimile number.

However, since specific symbols such as "@", "." and the like are used for the E-mail address, the same effect can be obtained even if it is judged, according to whether or not these symbols are included in the input data, whether or not the input data represents the E-mail address.

As described above, according to the present invention, both the E-mail address and the facsimile number can be registered for the abbreviation dial key or the one-touch dial key provided on the facsimile apparatus, and the "E-MAIL" key and the "FAX" key are also provided, thereby linking together and operating these keys. Thus, in the state that the E-mail address and the facsimile number of the identical destination have been registered for the unique abbreviation dial number of the like, it is possible based on user's intention to determined whether the original document should be sent as the E-mail or the facsimile, whereby there is a significant effect that the E-mail sending and the facsimile sending can be easily executed without increasing the number of abbreviation dial keys and the like.

Further, by utilizing the fact that in ISDN the communication can be executed with two channels at the same time, it is possible to obtain a significant effect that the E-mail and the facsimile can be sent at the same time by simple management.

What is claimed is:

1. A communication apparatus including means for connecting to a public communication line, a scanner for reading an image, means for converting the image read by said scanner to have a predetermined format, and means for executing a sending process to a server connected to the public communication line in a case where it is necessary to send the converted image-as an electronic mail to the Internet, said apparatus comprising:

means for registering a facsimile number of a destination for an abbreviation number;

means for registering both a facsimile number and an electronic mail address of a destination for one abbreviation number;

means for executing the facsimile sending of the read image to the registered facsimile number in a case where said key representing the facsimile sending is depressed pursuant to the one abbreviation number; and means for executing the electronic mail sending of the read image to the registered electronic mail address in a case where said key representing the electronic mail sending is depressed pursuant to the one abbreviation number, wherein the public communication line is a digital communication line capable of simultaneously executing plural communications, and wherein said apparatus comprises means for executing the facsimile sending of the read image to the registered facsimile number by using a first communication channel, and means for executing the electronic mail sending of the read image to the registered electronic mail address by using a second communication channel, in a case where said key representing the facsimile sending and said key representing the electronic mail sending are depressed pursuant to the one abbreviation number.

2. A communication apparatus including means for connecting to a public communication line, a scanner for reading an image, means for converting the image read by said scanner to have a predetermined format, and means for executing a sending process to a server connected to the public communication line in a case where it is necessary to send the converted image as an electronic mail to the Internet, said apparatus comprising:

means for registering both a facsimile number and an electronic mail address of a destination for one abbreviation number;

a key corresponding to the one abbreviation number, a key representing facsimile sending, and a key representing electronic mail sending;

means for executing the facsimile sending of the read image to the registered facsimile number in a case where said key representing the facsimile sending is depressed pursuant to the one abbreviation number; and means for executing the electronic mail sending of image to the registered electronic mail address in a case where said key representing the electronic mail sending is depressed pursuant to the one abbreviation number;

wherein the public communication line is a digital communication line capable of simultaneously executing plural communications, and there is prepared a key representing simultaneous sending of the facsimile and the electronic mail, said key being depressed pursuant to the one abbreviation number, wherein said apparatus executes the facsimile sending of the read image to the registered facsimile number by using a first communication channel, and executes the electronic mail sending of the read image to the registered electronic mail address by using a second communication channel, in a case where said key representing the simultaneous sending is depressed.

3. A communication apparatus including means for connecting to a public communication line, a scanner for reading an image, means for converting the image read by said scanner to have a predetermined format, and means for executing a sending process to a server connected to the public communication line in a case where it is necessary to send the converted image as an electronic mail to the Internet, said apparatus comprising:

means for registering both a facsimile number and an electronic mail address of a destination for one abbreviation number;

a key corresponding to the one abbreviation number, a key representing facsimile sending, and a key representing electronic mail sending;

means for executing the facsimile sending of the read image to the registered facsimile number in a case where said key representing the facsimile sending is depressed pursuant to the one abbreviation number; and means for executing the electronic mail sending of the read image to the registered electronic mail address in a case where said key representing the electronic mail sending is depressed pursuant to the one abbreviation number, wherein said apparatus comprises:

means for registering, in the registering process for the one abbreviation number, input data as the electronic mail address in a case where said key representing the electronic mail sending is depressed pursuant to depression of the electronic mail address; and means for registering, in the registering process for the one abbreviation number, the input data as the facsimile number in a case where said key representing the facsimile sending is depressed pursuant to depression of the facsimile number.

4. A communication apparatus including means for connecting to a public communication line, a scanner for reading an image, means for converting the image read by said scanner to have a predetermined format, and means for executing a sending process to a server connected to the public communication line in a case where it is necessary to send the converted image as an electronic mail to the Internet, said apparatus comprising:

means for registering both a facsimile number and an electronic mail address of a destination for one abbreviation number;

a key corresponding to the one abbreviation number, a key representing facsimile sending, and a key representing electronic mail sending;

means for executing the facsimile sending of the read image to the registered facsimile number in a case where said key representing the facsimile sending is depressed pursuant to the one abbreviation number; and means for executing the electronic mail sending of the read image to the registered electronic mail address in a case where said key representing the electronic mail sending is depressed pursuant to the one abbreviation number, wherein said apparatus comprises means for registering, in the registering process for the abbreviation number, input data as the electronic mail address in a case where a specific symbol used in the electronic mail address is included in the input data.

5. A communication apparatus including means for connecting to a public communication line, a scanner for reading an image, means for converting the image read by said scanner to have a predetermined format, and means for executing a sending process to a server connected to the public communication line in a case where it is necessary to send the converted image as an electronic mail to the Internet, said apparatus comprising:

means for registering both a facsimile number and an electronic mail address of a destination for one abbreviation number;

a key corresponding to the one abbreviation number, a key representing facsimile sending, and a key representing electronic mail sending;

means for executing the facsimile sending of the read image to the registered facsimile number in a case where said key representing the facsimile sending is depressed pursuant to the one abbreviation number; and means for executing the electronic mail sending of the read image to the registered electronic mail address in a case where said key representing the electronic mail sending is depressed pursuant to the one abbreviation number, wherein said apparatus comprises a first CPU (central processing unit) for detecting that said key representing the electronic mail sending is depressed, means for notifying a second CPU that said first CPU executed the detection, and means for forming electronic mail data when said second CPU receives the notification, wherein said second CPU causes said means for executing a sending process to execute the sending process to the server connected to the public communication line.

* * * * *

UNITED STATES PATENT AND TRADEMARK OFFICE
CERTIFICATE OF CORRECTION

| | | |
|---|---|---|
| PATENT NO. | : 7,145,993 B2 | Page 1 of 1 |
| APPLICATION NO. | : 09/973056 | |
| DATED | : December 5, 2006 | |
| INVENTOR(S) | : Michihiro Izumi et al. | |

It is certified that error appears in the above-identified patent and that said Letters Patent is hereby corrected as shown below:

ON THE TITLE PAGE, ITEM -56- FOREIGN PATENT DOCUMENTS

"10042068 A" should read -- 10-042068 A --;
"10126600 A" should read -- 10-126600 A --; and
"2000059531 A" should read -- 2000-059531 A --.

COLUMN 5

Line 41, "(Method" should read -- ¶ (Method --.

COLUMN 7

Line 18, "Email," should read -- E-mail, --.

COLUMN 8

Line 19, "image-as" should read -- image as --.

Signed and Sealed this

Twenty Second Day of April, 2008

JON W. DUDAS
*Director of the United States Patent and Trademark Office*